United States Patent Office 3,024,099
Patented Mar. 6, 1962

3,024,099
CORROSION-INHIBITED LIQUID FERTILIZER COMPOSITIONS
Carl Robert Martinson, Belleville, Ill., assignor to Monsanto Chemical Company, St. Louis, Mo., a corporation of Delaware
No Drawing. Filed May 20, 1957, Ser. No. 660,038
2 Claims. (Cl. 71—34)

This invention relates to improved liquid fertilizer compositions which are characterized by a material reduction in the corrosion of storage containers and application equipment. More specifically this invention relates to corrosion-inhibited liquid fertilizer compositions which are suitably used in aluminum equipment.

An early source of nitrogen in agricultural application was the use of ammonium nitrate solutions. The ammonium nitrate solutions were generally held in aluminum storage tanks and dispensed in the field with aluminum equipment. Accordingly, the industry has a considerable present investment in aluminum storage vessels and application equipment. In recent years there has been a growing demand for liquid fertilizers generally, i.e. fertilizer compositions which also contain $P_2O_5$ with or without $K_2O$ to provide a complete liquid formulation. However it was found that the presence of liquid fertilizer compositions containing $P_2O_5$ caused excessive corrosion to the aluminum equipment which was then in wide use.

It is the principal object of this invention to provide a substantially neutral liquid fertilizer composition containing $P_2O_5$ which can be stored and dispensed with aluminum equipment. Another object of this invention is to provide a substantially neutral liquid fertilizer composition containing $P_2O_5$ which is characterized by a low rate of corrosion when employed with aluminum equipment. Other objects will be apparent from the following disclosure.

It has now been found that from about 200 up to about 500 p.p.m. of fluoride as a soluble fluosilicate when present in substantially neutral liquid fertilizer compositions containing the phosphate nutrient, i.e. the orthophosphate ion, provides a liquid fertilizer composition which can be employed in aluminum equipment. The preferred suitable fluosilicates are sodium fluosilicate, ammonium fluosilicate, and potassium fluosilicate.

The substantially neutral liquid fertilizer compositions are generally formulated by various mixtures of monoammonium phosphate, diammonium phosphate, ammonium nitrate, ammonium sulfate, urea, potassium chloride, potassium nitrate, monopotassium phosphate, dipotassium phosphate, and the like, or by the use of anhydrous ammonia, aqua ammonia, phosphoric acid, potassium hydroxide, and the like to directly produce a substantially neutral salt solution. Thus the neutral liquid fertilizer solutions can be a solution of ammonium phosphate or ammonium phosphate to which has been added ammonium nitrate, urea, potassium chloride, and the like to form a variety of N—P or N—P—K liquid fertilizers. The pH of the liquid fertilizer composition preferably ranges from about 6 to about 8.

As is well known, fertilizer composition are conventionally labeled in terms of the principal nutrient components therein, i.e. nitrogen, phosphorus, and potassium, wherein phosphorus and potassium are given in terms of $P_2O_5$ and $K_2O$, respectively, and the N—P—K designation hereinabove and hereinafter employed will be understood in these terms.

Various illustrative neutral liquid fertilizer compositions are shown in the following table wherein the various components are indicated in parts by weight.

| No. | N-P-K | Ammonia | Ammonium nitrate | Ammonium sulfate | Urea | Phosphoric acid (75%) | Monoammonium phosphate | Diammonium phosphate | Potassium chloride | Potassium nitrate | Water |
|---|---|---|---|---|---|---|---|---|---|---|---|
| 1 | 8-24-0 | | | | | | 10.7 | 32.8 | | | 56.5 |
| 2 | 8-24-0 | 9.8 | | | | 44.5 | | | | | 45.7 |
| 3 | 12-20-0 | | | | 11.5 | | 8.9 | 27.4 | | | 52.2 |
| 4 | 8-20-0 | | | 6.0 | | | 8.9 | 27.4 | | | 57.7 |
| 5 | 11-22-0 | | | | 7.8 | | 9.8 | 30.1 | | | 52.3 |
| 6 | 13-13-0 | | 24.9 | | | | 5.8 | 17.8 | | | 51.6 |
| 7 | 7-21-5 | | | | | | 9.4 | 28.7 | 8.1 | | 53.8 |
| 8 | 6-20-6 | 7.4 | | | | 37.1 | | | 9.8 | | 45.2 |
| 9 | 5-20-10 | 6.2 | | | | 37.1 | | | 16.8 | | 40.0 |
| 10 | 10-15-5 | 6.1 | 5.2 | | 4.0 | 27.8 | | | | 11.0 | 46.0 |
| 11 | 10-15-5 | 6.1 | 7.3 | | 5.6 | 27.8 | | | 8.1 | | 45.1 |
| 12 | 5-15-5 | 6.2 | | | | 27.8 | | | 8.1 | | 57.9 |
| 13 | 10-10-10 | 3.5 | | | 15.8 | 18.5 | | | 16.3 | | 45.9 |
| 14 | 5-10-10 | | 2.4 | | 2.0 | | 4.5 | 13.7 | 16.2 | | 61.3 |
| 15 | 10-10-5 | 3.5 | | | 15.8 | 18.5 | | | 8.1 | | 54.0 |
| 16 | 5-10-5 | | | 7.8 | | | 4.5 | 13.7 | 8.1 | | 66.0 |
| 17 | 12-6-6 | | 14.0 | | 11.2 | | 2.7 | 8.2 | 9.7 | | 54.2 |
| 18 | 10-5-5 | | 24.0 | | | | 2.2 | 6.8 | 8.1 | | 58.9 |
| 19 | 3-9-9 | | | | | | 4.0 | 12.4 | 14.5 | | 69.2 |

The pH of the above formulations as a 1 to 10 dilution with water will vary between about 6 to about 8 and most will vary between about 6.5 to about 7.5.

The subject liquid fertilizer compositions can also contain minor amounts of surfactants to facilitate the assimilation of the nutrient composition by the plant, minor amounts of essential trace elements in available form, and the like. The desired liquid fertilizer composition can be formulated batchwise or by a continuous process as will be readily understood by those skilled in the art.

The following examples are illustrative of the instant invention.

*Example 1*

Since the high phosphate content liquid fertilizer composition was found to cause the most severe corrosion rate of the various formulations, the 8–24–0 composition was selected such that the following evaluation results would generally exemplify the most drastic corrosive effects which might be met in the field.

A liquid fertilizer composition (8–24–0) was prepared by dissolving 107 parts by weight of monoammonium phosphate and 328.1 parts by weight of diammonium phosphate in 564.9 parts by weight of water. Similar compositions were prepared which contained varying amounts of fluorine, as sodium fluosilicate, as a corrosion inhibitor in the said liquid fertilizer composition. The corrosion rates of the liquid fertilizer compositions on 3SO aluminum at 140° F. are shown in the following table:

| No. | P.p.m. fluorine as Na$_2$SiF$_6$ | Rate of corrosion (mils/year) |
|---|---|---|
| 1 | 0 | 1,050 |
| 2 | 100 | 237 |
| 3 | 200 | 50 |
| 4 | 300 | 47 |
| 5 | 400 | 37 |

A further evaluation on another aluminum sample at 140° F., wherein the liquid fertilizer composition was inhibited by the presence of 500 p.p.m. of fluorine as sodium fluosilicate reduced the corrosion rate to 25 m.p.y. It was further found that the liquid fertilizer composition inhibited by the presence of 500 p.p.m. of fluorine as sodium fluosilicate had a corrosion rate of about 7.5 m.p.y. at 104° F.

*Example 2*

It was also found that the presence of minor amounts of the sodium fluosilicate was beneficial even in the less corrosive liquid fertilizer compositions. Thus a 3-9-9 formulation was prepared by dissolving 4 pounds of monoammonium phosphate, 12.3 pounds of diammonium phosphate and 14.5 pounds of potassium chloride in 69.2 pounds of water per 100 pounds of liquid fertilizer composition and a 10-5-5 formulation was prepared by dissolving 2.2 pounds of monoammonium phosphate, 6.8 pounds of diammonium phosphate, 24 pounds of ammonium nitrate and 8.1 pounds of potassium chloride in 58.9 pounds of water per 100 pounds of liquid fertilizer composition. When the aforesaid liquid fertilizer compositions were inhibited by the addition thereto of about 250 p.p.m. of fluorine as sodium fluosilicate and the rate of corrosion evaluated in the presence of 3SO aluminum at about 140° F., it was found that the corrosion rate of each of said fertilizer compositions was reduced to substantially zero.

Qualitative and quantitative evaluation of the liquid fertilizer compositions containing up to 500 p.p.m. of fluorine as sodium fluosilicate conclusively demonstrated that the inhibited fertilizer compositions produced no phytotoxic effect on the germination or growth of radish, cucumber, tomato and rye grass seeds. The aforesaid plants do not have particularly hardy seedlings, accordingly, it can be reasonably concluded that since the inhibited formulation exhibits no deleterious effects to these seedlings, it can be safely used with any seedlings and/or plants. However, it is recommended that concentrations greater than 500 p.p.m. of fluorine should be avoided as such solutions may be phytotoxic to some plants.

I claim:

1. A method of inhibiting the corrosion of aluminum equipment by aqueous, liquid fertilizer compositions having a pH between about 6 and about 8 and containing an inorganic orthophosphate salt selected from the group consisting of monoammonium orthophosphate, diammonium orthophosphate, monopotassium orthophosphate, and dipotassium orthophosphate, said method comprising the incorporation therein of from about 200 to about 500 p.p.m. of fluorine as a soluble fluosilicate compound selected from the group consisting of sodium fluosilicate, potassium fluosilicate, and ammonium fluosilicate.

2. The method of claim 1, wherein about 500 p.p.m. fluorine as sodium fluosilicate is employed.

References Cited in the file of this patent

UNITED STATES PATENTS

| 2,028,343 | Michel | Jan. 21, 1936 |
| 2,238,651 | Keenen | Apr. 15, 1941 |
| 2,586,709 | Phillips | Feb. 19, 1952 |
| 2,719,781 | Hesch | Oct. 4, 1955 |
| 2,732,290 | Vana et al. | Jan. 24, 1956 |
| 2,739,886 | Facer | Mar. 27, 1956 |
| 2,778,712 | Caldwell | Jan. 22, 1957 |

FOREIGN PATENTS

| 736,215 | Great Britain | Sept. 7, 1955 |